United States Patent [19]

Sakata et al.

[11] Patent Number: 4,561,185
[45] Date of Patent: Dec. 31, 1985

[54] MEASURING INSTRUMENT

[75] Inventors: Hideo Sakata; Hiroshi Yamashiro, both of Kawasaki, Japan

[73] Assignee: Mitutoyo Mfg. Co., Ltd., Tokyo, Japan

[21] Appl. No.: 594,091

[22] Filed: Mar. 28, 1984

[30] Foreign Application Priority Data

Mar. 31, 1983 [JP] Japan .................................. 58-56479
Mar. 31, 1983 [JP] Japan .................................. 58-56480

[51] Int. Cl.⁴ ............................................... G01B 3/18
[52] U.S. Cl. ..................................... 33/164 R; 33/166
[58] Field of Search .................................. 33/163–167

[56] References Cited

U.S. PATENT DOCUMENTS 3,514,865  6/1970  Karahshi ............................... 33/166
3,877,149  4/1975  Masuda ................................. 33/166

FOREIGN PATENT DOCUMENTS 57-179701  11/1982  Japan .
58-15101    1/1983  Japan .
58-89806    6/1983  Japan .
2099585    12/1982  United Kingdom ............. 33/164 R Primary Examiner—Harry N. Haroian
Attorney, Agent, or Firm—Flynn, Thiel, Boutell & Tanis

[57] ABSTRACT

The present invention relates to a measuring instrument, and this measuring instrument comprises a main frame for axially movably supporting a spindle, a first tubular member having loosely inserted thereinto an engageable member projected from the spindle so as to axially move the spindle, a second tubular member coupled onto the first tubular member and having an elongate groove having inserted thereinto the engageable member, an outer tube coupled onto the second tubular member hand having a spiral groove engaging the forward end of the engageable member and a displacement value detector for detecting a displacement value of the spindle in the axial direction thereof, and the spindle is made linearly movable through the rotation of the outer tube.

13 Claims, 10 Drawing Figures

MEASURING INSTRUMENT

BACKGROUND OF THE INVENTION

1. Field of the Invention

This invention relates to measuring instruments including a micrometer or the like, and more particularly to improvements in spindle driving construction for moving spindles of the measuring instruments.

2. Description of the Prior Art

There have been proposed by the present applicant micrometers, in each of which a spindle is linearly and axially movable, while a screw feed system is adopted, but yet, the spindle is not rotated (Japanese Patent Kokai (Laid-Open) Nos. 179701/82, 15101/83 and Japanese Utility Model Application No. 185116/81). The micrometers thus proposed, being capable of driving the spindle at high speed and easy in holding the measuring pressure, are excellent in the controllability at high speed and the easiness in handling.

Now, in each of the proposed micrometers, spindle rotation locking means has been constituted by an engageable member projected in the radial direction of the spindle and a tubular guide member having an elongate groove, to which the engageable member is coupled, and the elongate groove has been opened at one end of the guide member. The opening at one end of the elongate groove has been due to the reason for assembling, but, due to the reason for finishing. More specifically, the guide member must be a tubular member having a comparatively large wall thickness because it holds the spindle, while, in order to satisfy the finishing accuracy of the elongate groove, the use of an end mill or the like is not satisfactory and grinding works are required. Therefore, if one end of the elongate groove would be blocked, then the length of the elongate groove would not be sufficient. For example, FIGS. 1A and 1B show a tubular member 1 of a small wall thickness and a tubular member 2 of a large wall thickness, both of which have outer diameters equal to each other. It is apparent that, when the both tubular members are ground by one and the same grinding machine 5 to form elongate grooves 3 and 4, if the elongate grooves are ground in a state where opposite ends are blocked, then a length $L_2$ of the elongate groove 4 of the tubular member 2 of the large wall thickness is considerably short as compared with a length $L_1$ of the elongate groove 3 of the tubular member 1 of the small wall thickness.

Then, in each of the proposed micrometers described above, in order to secure the wall thickness of the guide member to a certain degree, but yet, make the length of the elongate groove sufficient, the elongate groove has been opened at one end of the guide member. However, in such a case as above, the following disadvantages tend to occur.

Since the elongate groove is provided for coming into contact with an engageable member projectingly provided on the spindle to lock the rotation of the spindle, the engageable member of the spindle constantly applies a force to the elongate groove to expand the elongate groove during the movement of the spindle in the axial direction, and, due to this force, such a phenomenon tends to occur that the guide member is expanded in its diameter and so on. Due to this phenomenon, a deflection (an inaccurate displacement), being slight though, occurs in the spindle. Because of this, for example, in the case where an optical detector is adopted, the positional relationship between a main scale secured to the spindle and an index scale secured to a body frame fluctuates, and after all, the adoption of a high accuracy displacement detector should not necessarily secure a satisfactorily high accuracy measurement.

Now, in the micrometer illustrated in Utility Model Application No. 185116/81 out of the above-described micrometers, a guide member being in parallel to the spindle is secured to the spindle through a connecting rod so as to maintain and regulate the spindle in its rotating direction, and the aforesaid main scale is affixed to this connecting rod, so that the spindle can be prevented from being deflected, thereby possibly enabling to achieve the high accuracy measurement. However, in the micrometer of the type described, since it is necessary to provide all of the guide member, the connecting rod and a relief space for the main scale in the interior of a main body, the measuring instrument as a whole is rendered large and complicated in construction and becomes expensive in manufacturing cost, a carrying means for preventing the vibrations and the like of the main scale must be firm in construction, and the problem of the expansion in diameter of the elongate groove by the engageable member remains unsolved.

Additionally, the above-described problem is common not only in the field of the micrometers but also in the field of the instruments having a driving mechanism for linearly moving the spindle under a screw feed system in general.

SUMMARY OF THE INVENTION

The present invention has as its object the provision of a measuring instrument, wherein a deflection of a spindle in its rotating direction, which has occurred during the movement of the spindle, is obviated, so that the high accuracy measurement can be readily performed.

To this end, the present invention contemplates that, in a measuring instrument for measuring dimensions, positions and the like of a workpiece to be measured by a displacement value of a spindle axially movable with respect to a main frame, the spindle is supported by the main frame through a first tubular member having a loose insertion groove, into which is loosely inserted an engageable member projected from the spindle in the radial direction thereof, spindle rotation locking means and a spindle driving mechanism are provided, the spindle rotation locking means comprising the engageable member and a second tubular member of a small wall thickness conpled and affixed onto the first tubular member and including an elongate groove having thereinto inserted the engageable member, guiding the engageable member in the axial direction of the spindle and blocked at opposite ends thereof.

DETAILED DESCRIPTION OF THE PREFERRED EMBODIMENT

Description will hereunder be given of embodiments of the present invention with reference to the drawings.

Figure 1A:
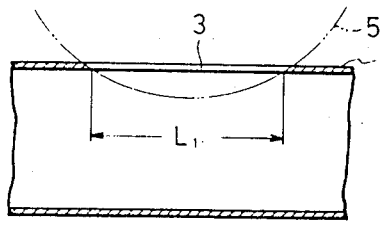
FIGS. 1A and 1B are sectional views showing the effective lengths of respective elongate grooves when the elongate grooves are formed by grinding on a small wall thickness tubular member and a large wall thickness tubular member.
Figure 1B:
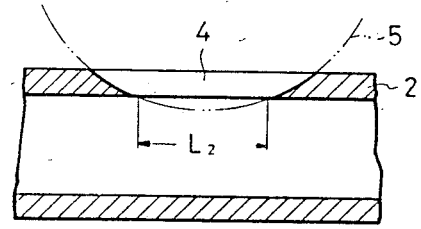
Figure 2:
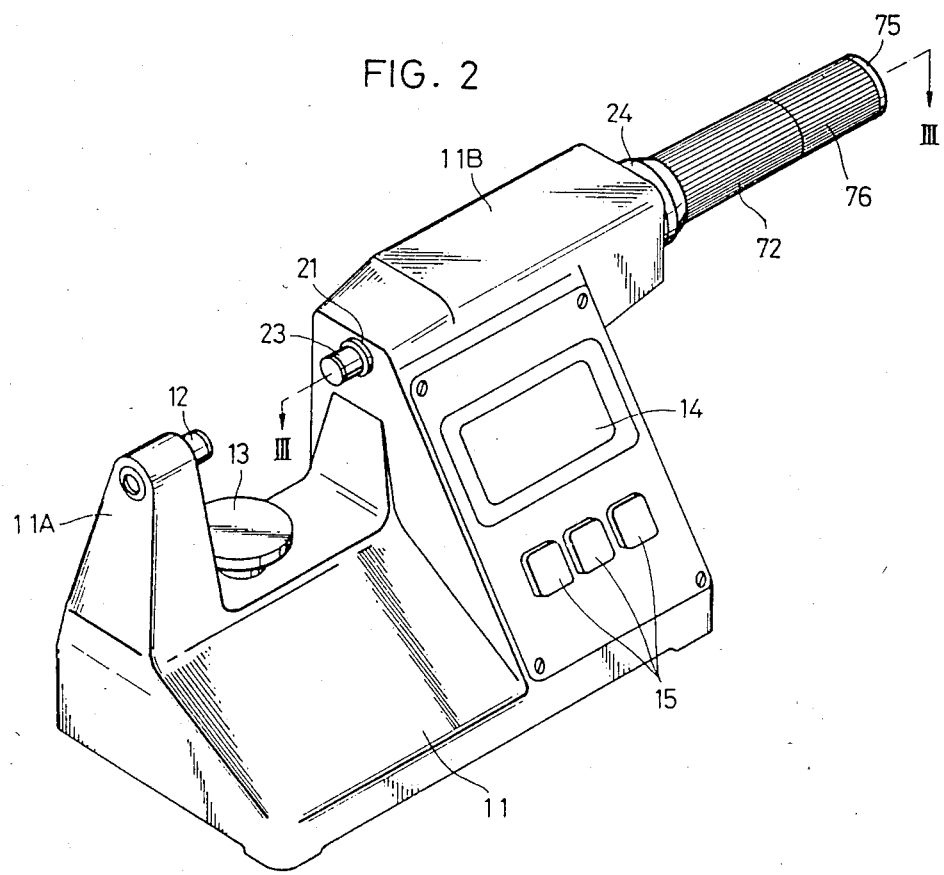
FIG. 2 is a perspective view showing the general arrangement of one embodiment of the present invention.

FIG. 2 shows the general arrangement of one embodiment, in which the present invention is applied to a micrometer. In the drawing, a main frame 11 of an installation type is provided at one end thereof with a projected portion 11A for an anvil and at the other end thereof with a spindle support portion 11B, the projected portion 11A for an anvil is provided with an anvil 12, and a mount 13 is vertically, positionally adjustably mounted between the projected portion 11A for the anvil and the spindle support portion 11B. Furthermore, on the front face of the main frame 11, there are provided a digital indication portion 14 for digitally indicating a measured value and a control button group 15 including an on-off button, a zero set button, a battery check button and the like.

Figure 3:
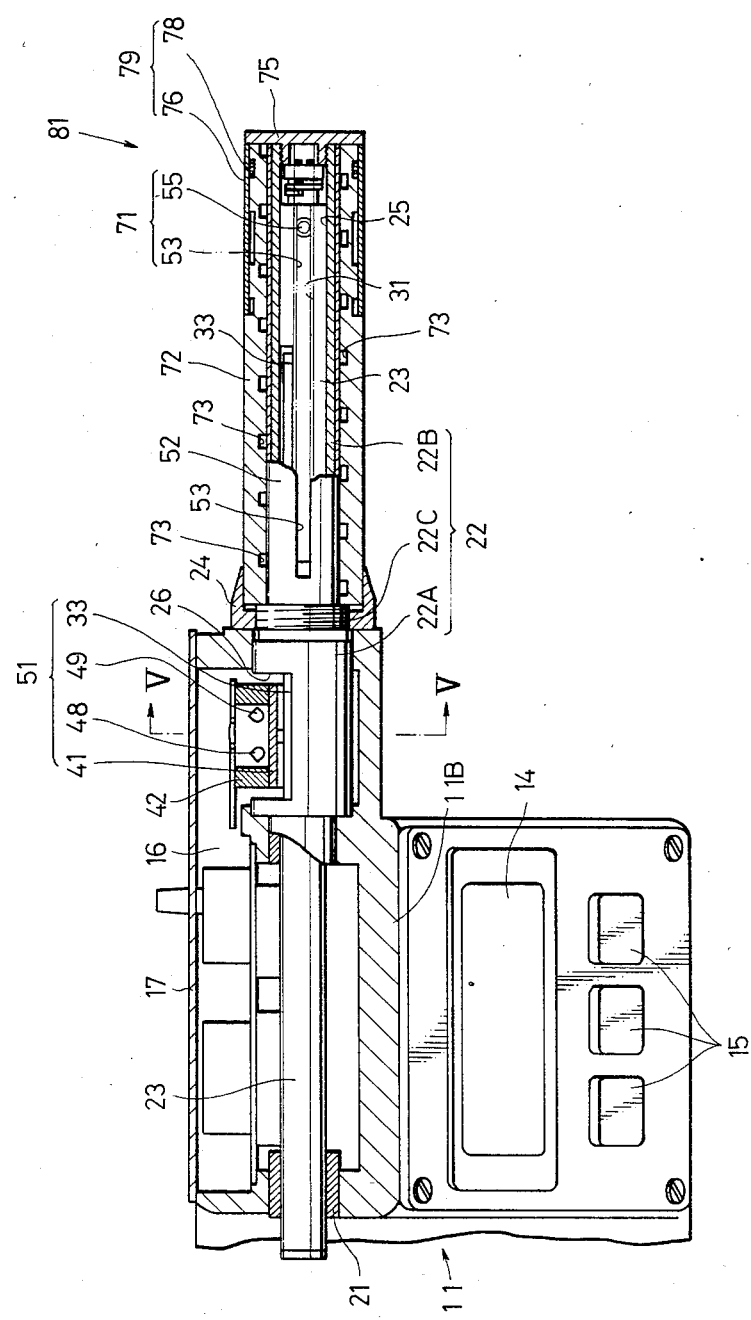
FIG. 3 is a sectional view taken along the line III—III in FIG. 2.
Figure 4:
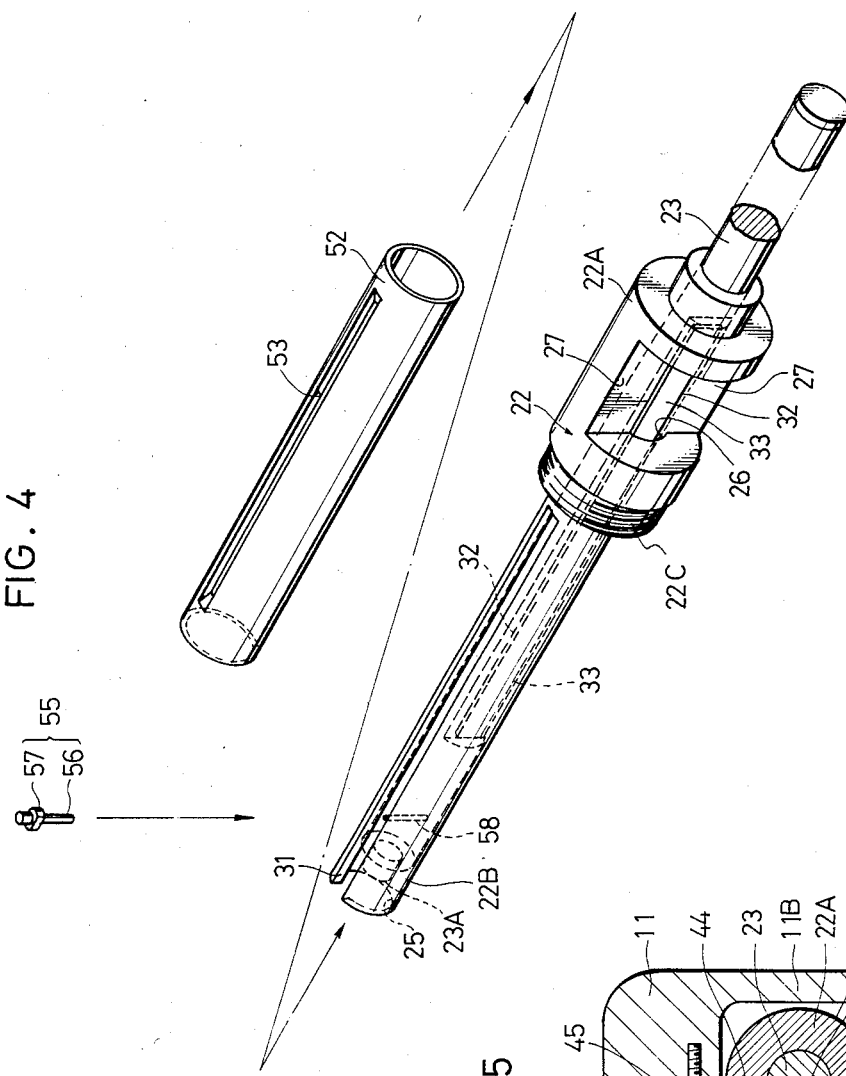
FIG. 4 is an enlarged, disassembled perspective view showing the arrangements of the spindle, the first and second tubular members in the above embodiment.

As shown in FIG. 3, the spindle support portion 11B of the main frame 11 is provided therein with a hollow space 16, which is blocked by a back cover 17. A round shaft-shaped spindle 23 is axially movably supported by the spindle support portion 11B through a bearing 21 and a first tubular member 22. As shown in FIG. 4, the first tubular member 22 is formed into a substantially stepped round shaft shape and provided at the end (stepped portion) of a large diameter portion 22A on the side of a small diameter portion 22B with a threaded portion 22C. A threaded ring 24 (Refer to FIG. 3) is threadably coupled onto the threaded portion, whereby the threaded ring 24 is brought into pressing contact with an end face of the spindle support portion 11B, so that the first tubular member 22 can be affixed to the main frame 11.

A retaining hole 25 being of true round in cross section for slidably retaining the spindle 23 is axially extended through a center axis of the first tubular member 22. Furthermore, one side surface of the large diameter portion 22A is cut away for a predetermined length in the axial direction to form a window portion 26, which is communicated with the retaining hole 25. Additionally, planar mounting portions 27 are formed at opposite sides in the vertical direction of this window portion 26 as shown in FIG. 4.

The small diameter portion 22B is formed to have a comparatively large wall thickness, holds the spindle 23 satisfactorily firmly, stably and slidably, and is formed at its side surface with a loose insertion groove 31 being of a predetermined width in the axial direction of the first tubular member 22, i.e., the axial direction of the spindle 23 with the loose insertion groove 31 being opened at one end of the small diameter portion 22B.

One side surface of the spindle 23 slidably held in the retaining hole 25 of the first tubular member 22 is cut away for a predetermined length in the axial direction of the spindle 23, and a flat portion 32 is formed as the cut-away portion. A main scale 33 as being a first detecting member is pasted and affixed onto the flat portion 32. This main scale 33 is constructed in a manner to be entirely housed in the retaining hole 25, be movable together with the spindle 23 in the retaining hole 25, and be able to be exposed to the outer periphery of the first tubular member 22 from the window poriton 26.

Figure 5:
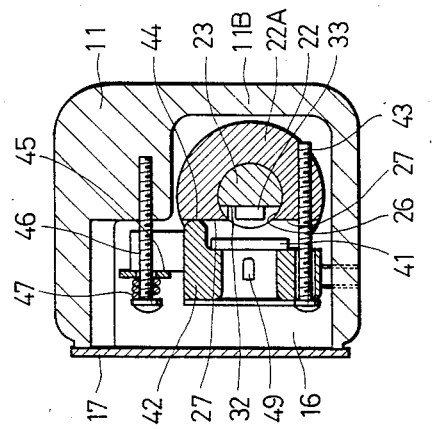
FIG. 5 is an enlarged sectional view taken along the line V—V in FIG. 3.

As shown in FIG. 5, an index scale 41 as being a second detecting member is opposed, parallel to and spaced a predetermined interval from the main scale 33 exposed from the window portion 26. The index scale 41 is secured to a side surface of a substantially square frame member-shaped holder 42, which is threadably secured to the planar mounting portion 27 through a mounting screw 43 at the lower portion of FIG. 5. Furthermore, a ridge portion 44 capable of contacting the planar mounting portion 27 is formed at a side edge of the holder 42 in the upper portion of the drawing. An adjusting screw 46 is secured to the holder to the upper end portion of this ridge portion 44 through a mounting piece 45. A compression coil spring 47 is confined between the adjusting screw 46 and the mounting piece 45. The ridge portion 44 is brought into pressing contact with the planar mounting portion 27 through the biasing force of the compression coil spring 47. The adjustment made by this adjusting screw 46 makes it possible to adjust a mounted angle of the holder 42 to the planar mounting portion 27, i.e., the positional relationship of the index scale 41 with the main scale 33.

As shown in FIG. 3, in the holder 42, there are mounted a light emitting element 48 for irradiating rays to the index scale 41 and the main scale 33 at a predetermined angle and a light receiving element 49 for receiving the rays irradiated from the light emitting element 48, being transmitted through the index scale 41, reflected by the main scale 33 and again transmitted through the index scale 41. Here, the light emitting element 48, the light receiving element 49, the main scale 33 as being the first detecting member and the index scale 41 as being the second detecting member constitute a displacement value detector 51 for converting an axial movement value of the spindle 23 into an electric signal to detect the displacement value.

A second tubular member 52 is coupled onto the small diameter portion 22B, of the first tubular member 22. This second tubular member 52 is formed to have a length substantially equal to that of the small diameter portion 22B, is a small wall thickness cylinder member made highly hard through hardening or the like, and formed at a side surface in the longitudinal direction thereof (consequently, in the axial direction of the spindle 23) with an elongate groove 53. This elongate groove 53 is ground at high accuracy to a predetermined width smaller than the width of the loose insertion groove 31, and blocked at opposite ends thereof. In other words, the opposite ends of the second tubular member 52 are continuous along the circumferential directions, so that, even when a force to expand the width of the elongate groove 53 is applied, the second tubular member cannot easily expanded in its diameter.

On the other hand, an engageable member 55 is projected from a predetermined position of the spindle 23 disposed in the small diameter portion in the radial direction, and this engageable member 55 is loosely inserted through the loose insertion groove 31, and thereafter, inserted into the elongate groove 53 in such a manner that the opposite sides thereof are guided by the elongate groove 53.

Figure 6:
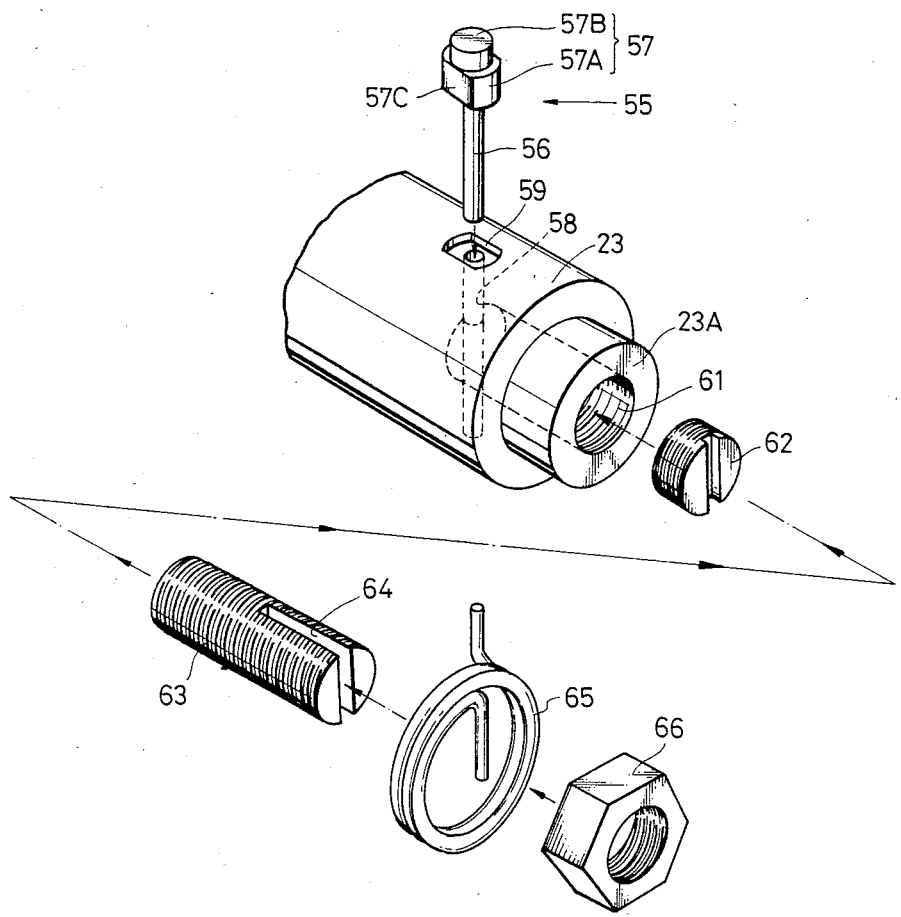
FIG. 6 is an enlarged, disassembled view showing the arrangement of one end portion of the spindle in the above embodiment.

As shown in FIG. 6, the engageable member 55 is constituted by a pin-like insert portion 56 and a head 57, and the insert portion 56 is adapted to be inserted into a mounting hole 58 formed in the spindle 23 in the diametral direction thereof. Furthermore, the head 57 is formed into a substantially stepped columnar member having a large diameter portion 57A and a small diameter portion 57B formed on the large diameter portion 57A. The opposite side surfaces of the large diameter portion 57A are cut away in planar shapes in the axial direction of the spindle 23, whereby planar contacting portions 57C are formed at the opposite side surfaces of the head, with a distance between the both planar contacting portions 57C, i.e., the width of the large diameter portion 57A being made equal to the diameter of the small diameter portion 57B. Furthermore, a retaining recess 59 identical in shape with the large diameter portion 57A and having a predetermined depth is formed at the top end portion of the mounting hole 58, and the lower end portion of the large diameter portion 57A is coupled to this retaining recess 59, whereby the planar contacting portions 57C are made accurately parallel to the axial direction of the spindle 23, so that the engageable member 55 can be projected from the spindle 23. Furthermore, the engageable member 55 can be brought into sliding and surface-to-surface contact with the inner peripheral surfaces of the elongate groove 53 at the planar contacting portions 57C.

Figure 8:
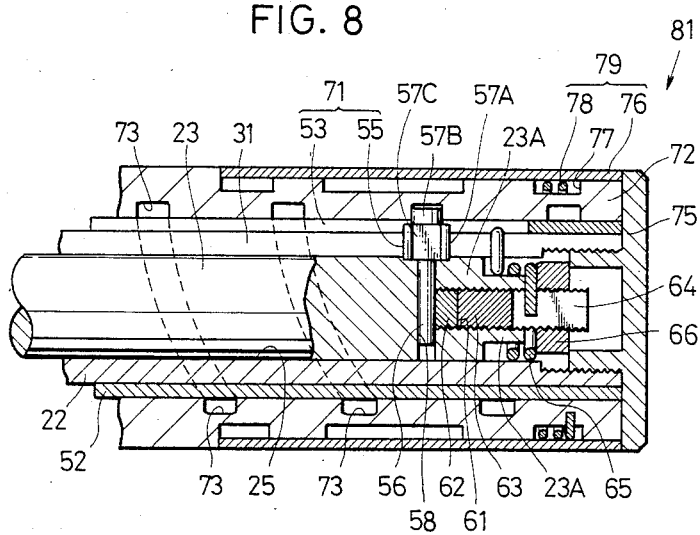
FIG. 8 is a sectional view taken along the line VIII—VIII in FIG. 7.

A small stepped portion 23A is projected from one end portion of the spindle 23 in the axial direction, an internally threaded portion 61 is formed from the end face of the small stepped portion 23A to the other end of the spindle 23, and the deepest portion of the internally threaded portion 61 is communicated with the mounting hole 58. A fixing screw shaft 62 having a predetermined length is threadably coupled into the internally threaded portion 61, whereby the insert portion 56 of the engageable member 55, which has been inserted into the mounting hole 58, is fixed to the spindle 23 through this fixing screw shaft 62 (Refer to FIG. 8).

Furthermore, a spring fixing screw 63 is adapted to be threadably coupled into the internally threaded portion 61. A spring fixing slit 64 having a predetermined depth is formed at one end portion of this spring fixing screw 63 in the diametral direction, and the spring fixing screw 63 is threadably coupled into the internally threaded portion 61 in such a manner that the spring fixing slit 64 projects from the small stepped portion 23A.

Figure 7:
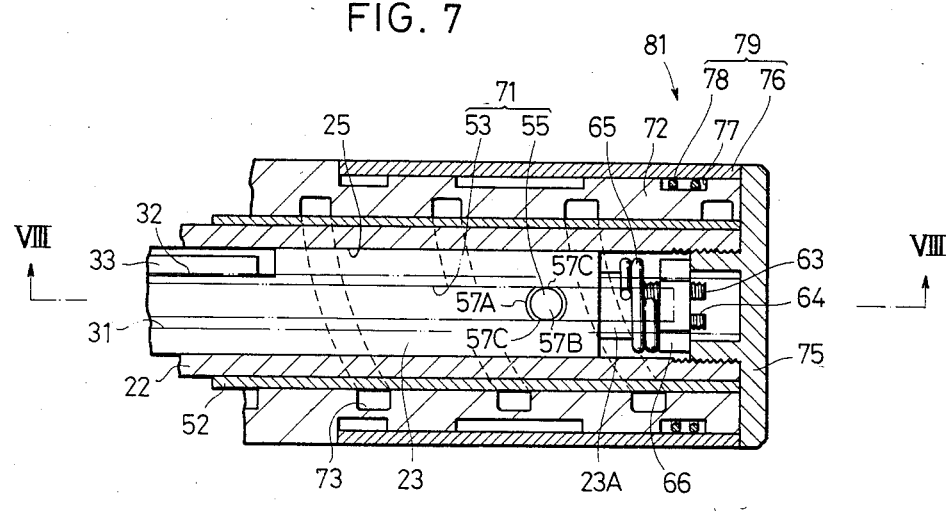
FIG. 7 is a sectional view enlargedly showing a portion of FIG. 3.

Supported by the outer periphery of the small stepped portion 23A is a torsional coil spring 65 as being rotary biasing means for biasing the spindle 23 to rotate in a predetermined direction with respect to the first tubular member 22. One end portion of the torsional coil spring 65 is bent inwardly in the radial direction of the small stepped portion 23A, and the other end portion bent outwardly in the radial direction of the small stepped portion 23A. The inwardly bent end portion is inserted into the spring fixing slit 64, while, the outwardly bent end portion is inserted into the elongate groove 53. After the one end portion of the coil spring 65 has been inserted into the spring fixing slit 64, a spring fixing nut 66 is threadably coupled onto the spring fixing screw 63 (Refer to FIGS. 7 and 8), whereby one end portion of the coil spring 65 is clamped between a side surface of the spring fixing nut 66 and the end face of the small stepped portion 23A to be affixed to the spindle 23 and the other end portion of the coil spring is inserted into the elongate groove 53. In consequence, the spindle 23 is rotatably biased in a direction in unison with the rotary biasing force of the coil spring 65 with respect to the second tubular member 52, whereby the engageable member 55 is brought into contact with one of the inner peripheral surface of the elongate groove 53 only at one of the planar contacting surfaces 57C. Here, the elongate groove 53 and the engageable member 55 constitute spindle rotation locking means 71. In addition, the rotational position of the spring fixing screw 63 (the inclinated position of the slit 64) can adjust the biasing force (the spring resiliency) of the torsional coil spring 65. However, a washer being substantially identical in shape with the end face of the small stepped portion 23A and having a slot in the radial direction may be interposed between the aforesaid end face and the fixing nut 66, so that the fixation of the spring 65 by the nut 66 may be made more reliable.

Rotatably supported on the outer periphery of the second tubular member 52 is an outer tube 72, on the inner peripheral surface of which is formed a spiral groove 73 slidably coupled thereonto with the small diameter portion 57B of the engageable member 55 and having a comparatively large pitch. An angle of torsion of this spiral groove 73 being in a range from 10 to 15 degrees, preferably from 13 to 14 degrees is desirable for the feeding of the spindle 23 at high speed and the obtaining of a self-lock action.

An inner end portion of a cover member 75 is threadably coupled into one end portion of the first tubular member 22 (Refer to FIGS. 7 and 8), and the outer tubu 72 is locked against dislodging by this cover member 75. Furthermore, rotatably coupled onto a portion of the outer periphery of the outer tube 72 is a cylindrical thimble 76. A spring retaining groove 77 is provided at a predetermined position of the outer peripheral portion of the outer tube 72 positioned on the inner periphery of the thimble 76 over the total circumference, and a right-handed rotation coil spring 78 for the constant pressure is wound in this spring retaining groove 77. One end of this coil spring 78 for the constant pressure is affixed to a predetermined position of the bottom of the spring retaining groove 77 (Refer to FIG. 8), the other end is in the free conditions, being not affixed, and the outer periphery of this coil spring 78 for the constant pressure is brought into pressing contact with the inner periphery of the thimble 76. This pressing contact generates a frictional force between the inner periphery of the thimble 76 and the outer periphery of the coil spring 78 for the constant pressure, and, when the thimble 76 is rotated, the rotation is imparted to the outer tubu 72 by the frictional force, whereby the outer tube 72 is rotated. The thimble 76 and the coil spring 78 for the constant pressure constitute constant pressure means 79.

Here, the engageable member 55, the outer tube 72 having the spiral groove 73 and the constant pressure means 79 constitute a spindle driving mechanism 81.

Brief description will hereunder be given of a method of assembling this embodiment.

The spindle 23 secured with the main scale 33 is inserted into the first tubular member 22, and this first tubular member 22 is threadably coupled and affixed to the main frame 11 by use of the threaded ring 24. Subsequently, the holder 42 is secured to the planar mounting portion 27 of the first tubular member 22. The mounting direction of this holder 42 is regulated by the adjustment of the adjusting screw 46. On the other hand, the spindle 23 is rotated to adjust the rotating direction of the spindle 23 such that the main scale 33 is exposed from the window portion 26 and the mounting hole 58 is disposed in the loose insertion groove 31.

Subsequently, the second tubular member 52 is coupled onto the small diameter portion 22B of the first tubular member 22, and the loose insertion groove 31 and the elongate groove 53 are superposed on each other, in which state, the engageable member 55 is secured to the spindle 23. Subsequently, when the torsional coil spring 65 is secured to one end portion of the spindle 23, the planar contacting portion 57C is brought into contact with only one side surface of the elongate groove 53.

Thereafter, the second tubular member 52 is rotatably adjusted through the outer periphery of the first tubular member 22 so that an interval between the main scale 33 secured to the spindle 23 and the index scale 41 secured to the first tubular member 22 can be held in very accurately parallel conditions, and, at a stage after the adjustment, the tubular member 52 is bonded and affixed to the outer periphery of the first tubular member 22 by use of a bonding agent and the like.

After the both scales 33 and 41 have been properly adjusted in their positional relationship as described above, the outer tube 72 is supported by the outer periphery of the second tubular member 52 with the small diameter portion 57B of the engageable member 55 being coupled into the spiral groove 73, and subsequently, the constant pressure means 79 and the cover member 75 are mounted, thus completing the assembling. Additionally, after the second tubular member 52 has been bonded to the first tubular member 22, if it becomes necessary to finely adjust the dispositions of the both scales 33 and 41, then the index scale 41 amy be finely adjusted with respect to the main scale 33 through the adjustment of the adjusting screw 46.

Description will hereunder be given of action of this embodiment.

Now, in the state illustrated in FIG. 2, if the thimble 76 is rotated in the counterclockwise direction in looking from the right end, i.e., to the left direction, then a force of frictional resistance is generated between the outer periphery of the coil spring 78 for the constant pressure, which is brought into pressing contact with the inner periphery of the thimble 76. This force of frictional resistance is imparted to the outer tube 72 through the coil spring 78 for the constant pressure, whereby the outer tube 72 tends to rotate to the left. In this case, since one end of the coil spring 78 for the constant pressure is not solidly secured, the aforesaid force of frictional resistance twistingly acts in the left-handed rotation on the outer periphery of this right-handed rotation coil spring 78, whereby the coil spring 78 tends to expand in its diameter. Therefore, the force of the coil spring 78 pressingly contacting the thimble 76 sharply increases, with which the aforesaid force of frictional resistance increases, whereby the thimble 76 and the coil spring 78 fall into the state of being locked, so that the thimble 76 and the coil spring 78 can be rotated in association with each other without sliding on each other.

When rotation of the thimble 76 causes the outer tube 72 to rotate to the left as described above, the engageable member 55 engaged with the spiral groove 73 tends to move along the spiral groove 73. However, since the engageable member 55 is also coupled into the elongate groove 53 of the second tubular member 52 affixed to the body frame 11, the engageable member 55 linearly and successively moves to the right in FIGS. 2 and 3 along with the rotation of the outer tube 72. Due to the movement of this engageable member 55, the spindle 23 also moves by the same value in the same direction as above, and the displacement value of this spindle 23 is electrically detected by the displacement value detector 51, so that the displacement value of the spindle 23 can be detected. The linear movement of the spindle 23 due to the rotation of the spiral groove 73 is performed rapidly (at high speed) because the pitch of the spiral groove 73 is large.

When a sufficient space is formed between the anvil 12 and the spindle 23 due to the movemnet of the spindle 23 to the right as described above, a workpiece to be measured, not shown, is disposed on the mount 13, and the thimble 76 is rotated in a direction opposite to the above. By this, the rotation of the thimble 76 is imparted to the outer tube 72 through the coil spring 78 by the frictional force between the inner periphery of the thimble 76 and the outer periphery of the coil spring 78, whereby this outer tube 72 is rotated to the right. In this case, the frictional force twistingly acts in the right-handed rotation on the outer periphery of the right-handed rotation coil spring 78, whereby the coil spring 78 tends to be shrunk in its diameter, so that a pressing contact force between the coil spring 78 and the thimble 76 acts in the direction of being weakened. However, when the spindle 23 is not in contact with the workpiece to be measured or the anvil 12, the spindle 23 is not subjected to a large force of resistance and moves smoothly, whereby the outer tube 72 is also smoothly rotated, so that the coil spring 78 and the thimble 76 can be integrally rotated by the preset pressing contact force.

When the thimble 76 is rotated to the right as described above, the spindle 23 is moved to the left through the actions of the coil spring 78, the outer tube 72, the spiral groove 73, the engageable member 55 and the elongate groove 53, and the movement of the spindle 23 is stopped in a state where the workpiece is clamped between the anvil 12 and the spindle 23. If the thimble 76 is caused to further move the thimble 76 to the right in this state, then a rotation moment acting on the thimble 76 increases, and, when a predetermined rotation moment is reached, the diameter of the coil spring 78 decreases, the frictional force between the coil spring 78 and the thimble 76 is reduced, and finally, a sliding of the thimble 76 is generated on the coil spring 78 to lead to idling, whereby a force of the spindle 23 contacting the workpiece, i.e., a measuring force is restricted to a predetermined value.

The engageable member 55 projected from the spindle 23 is constantly brought into contact with only one side of the elongate groove 53 through the resiliency of the torsional coil spring 65 as being the rotary biasing force, and this state where the engageable member 55 is brought into contact with only one side of the elongate groove 53 is continued irrespective of the moving direction of the spindle 23. Furthermore, the elongate groove 53 receives a force in the direction of expanding the width from the engageable member 55 contacting the elongate groove 53. However, the opposite ends of the elongate groove 53 are blocked, in other words, the opposite ends of the second tubular member 52 are continuous in the circumferential direciton, and consequently, even if the second tubular member 52 is formed to have a very small wall thickness, the elongate groove 53 is not expanded in its width and the second tubular member 52 is not expanded in its diameter.

This embodiment described above can offer the following advantages.

Since such an arrangement is adopted that the second tubular member 52 is provided on the outer periphery of the first tubular member 22 and the spindle 23 is linearly guided through the engageable member 55 by the elongate groove 53 provided on the second tubular member 52, the rotating direction of the spindle 23 to the main frame 11 may be adjusted through the rotatable adjustment of the second tubular member 52 after the spindle 23 has been affixed to the main frame 11 through the first tubular member 22. Hence, it has become very easy in assembling to make the direction of the main scale 33 suitable for the main frame 11, i.e., the index scale 41.

Furthermore, since the second tubular member 52 linearly guides the spindle 23, but, does not directly hold the spindle 23 on the side of the main frame 11, the second tubular member 52 can be formed to have a small wall thickness. In consequence, even if the elongate groove 53 formed by the grinding at high accuracy is formed to have blocked opposite end portions, the length of the elongate groove 53 can be made sufficiently long. In other words, since the second tubular member 52 may have the small wall thickness, so that the linearly moving stroke of the spindle 23 can be secured to have a sufficient length and the instrument as a whole can be rendered compact in size as compared with one having the same stroke as above.

Furthermore, since the opposite ends of the elongate groove can be blocked, even if the force of expanding the elongate groove 53 in its width is applied from the engageable member 55 to the elongate groove 53, the elongate groove 53 should not be expanded in its width as compared with the case where one end portion of the elongate groove 53 would be opened at one end portion of the second tubular member 52 for example. Hence, no deflection (an inaccurate displacement in the rotating direction) is generated in the spindle 23 during the movement of the spindle 23, the interval between the both scales 33 and 41 is constantly held properly, a displacement value of the spindle 23 detected by the displacement value detector 51 becomes very reliable and highly accurate, and such an advantage may be offered that the measurement in μm order be satisfactorily secured.

Additionally, only the second tubular member 52 may be easily hardened by the hardening and the like, improvements in both the high accuracy and wear resistance may be achieved, and further, the second tubular member 52 thus constructed is coupled onto the outer periphery of the first tubular member 22, to thereby form the first tubular member 22 to have a large wall thickness, so that no problem occurs even if one end portion of the loose insertion groove 31 is opened at one end portion of the first tubular member 22. Since the loose insertion groove 31 is formed to have a width wider than that of the elongate groove 53, the both scales 33 and 41 can be readily fine-adjusted therebetween through the rotatable adjustment made by the second tubular member 52.

Further, the head 57 of the engageable member 55 comprises the large diameter portion 57A and the small diameter portion 57B as described above, whereby the planar contacting portion 57C is brought into surface-to-surface contact with the elongate groove 53. In consequence, wear is prevented from this point as differed from the case of point-to-point contact and the like. On the other hand, the small diamter portion 57B being round in cross section is brought into line-to-line contact with the spiral groove 73, so that the movement of the spindle 23 due to the rotation of the spiral groove 73 can be performed smoothly.

Moreover, the engageable member 55 is brought into surface-to-surface contact with only one side of the elongate groove 53 through the resiliency of the torsional coil spring 65 as being the rotary biasing means. In other words, the clearance between the engageable member 55 and the elongate groove 53 is eliminated. In consequence, there is no possibility of occurrence of inaccurate rotation (deflection or backlash), from which point the positional relationship between the both scales 33 and 41 is held properly at all times, so that the high accuracy measurement can be advantageously secured. Moreover, the torsional coil spring 65 additionally functions as backlash preventing means between the engageable member 55 and the spiral groove 73, from which point the high accuracy measurement can be advantageously secured.

Furthermore, the spindle 23 is provided with the flat portion 32, to which the main scale 33 is directly secured, and both the spindle 23 and the main scale 33 are housed in the retaining hole 25 being of a simple round hole in cross section, so that the provision of a special relief space and the like for the main scale 33 is not required, and further, the provision of special carrying means and the like for constantly holding the spindle 23 and the main scale in parallel to each other is not needed, so that the construction can be very simplified and rendered compact in size. Moreover, the spindle 23 and the main scale 33 are formed into a unitary structure, whereby no vibrations are imparted to the spindle 23 during the movement of the spindle 23, and no deflection and the like is generated in the main scale 33, so that the construction highly suitable for improvements in the measuring accuracy can be obtained.

Additionally, in the above embodiment, the main frame 11 has been of the installation type, but, may be of a portable type.

Figure 9:
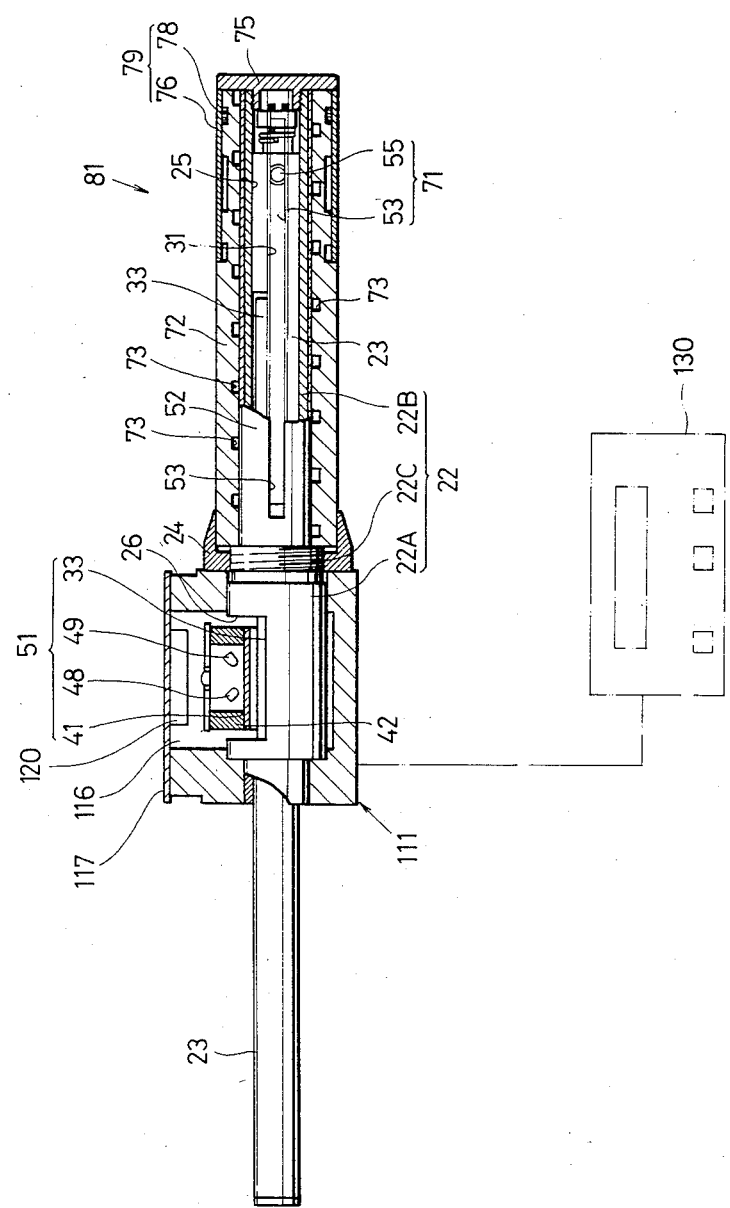
FIG. 9 is a sectional view showing an embodiment other than the above one.

In the foregoing, description has been given of the embodiment in which the spindle driving construction according to the present invention is applied to the micrometer, the invention need not necessarily be limited to this, but, as illustrated in FIG. 9 for example, the invention may be applied to a micrometer head used in a mechanism for feeding a movable table and the like of the measuring instrument. In this case, a spindle driving mechanism 81 is constructed such that only the large diameter portion 22A is supported by a main frame 111, and a movement value of the spindle 23 detected by a displacement value detector 51 provided in a hollow space 116 of this main frame 111 is indicated by a digital indication portion 120. Additionally, the digital indication portion 120 may be replaced by an external digital indicator 130 connected through an electric cord and the like.

The displacement value detector 51 has been the optical detector, the first detecting member the main scale 33 and the second detecting member the index scale 41, however, the invention need not necessarily be limited to this, but, for example, the displacement value detector 51 may be of an electrostatic type, and the first and second detecting members may be electrode members. Or, the displacement value detector may be of a magnetic type, and the first detecting member may be a magnetic scale and the second detecting member a magnetic head. In short, as the displacement value detector, any detector will do only if it can convert a movement value of the spindle into an electric signal to thereby detect the displacement value.

Furthermore, the index scale 41 need not necessarily be limited to the one secured to the first tubular member 22, but, may be one directly secured to the main frame 11. However, in the case of being secured to the first tubular member 22, the assembling and adjustment works are facilitated. Additionally, the constant pressure means 79 may be dispensed with.

Further, the spindle driving mechanism 81 need not necessarily be limited to the case where the mechanism is constituted by the engageable member 55, the outer tube 72 and the constant pressure means 79, but, for example, such constructions may be adopted which include a construction where a knob projected from the spindle 23 is caused to slide on the outer surface of the main frame 11, a construction consisting of a rack provided on the spindle 23 and a pinion being in meshing engagement with this rack and a construction of a cylinder-pistion type.

As has been described hereinabove, the present invention can provide the measuring instrument the deflection (inaccurate displacement in the rotating direction) of the spindle in the rotating direction, which would otherwise have occurred during the movement of the spindle, is obviated, so that the high accuracy measurement can be readily performed.

What is claimed is:

1. In a measuring instrument wherein a displacement value of a spindle axially movable with respect to a main frame is detected by a displacement value detector to thereby measure dimensions, position and the like of a workpiece to be measured, the improvement comprising wherein:
   said spindle is supported by said main frame through a first tubular member having a loose insertion groove, into which is loosely inserted an engageable member projected from said spindle in the radial direction; and
   a spindle rotation locking means and a spindle driving mechanism are provided, said spindle rotation locking means comprising said engageable member and a second tubular member of a small wall thickness coupled and affixed onto said first tubular member and including an elongate groove blocked at opposite ends and having thereinto inserted the engageable member, guiding the engageable member in the axial direction of the spindle, said spindle driving mechanism including said engageable member and an outer tube having a spiral groove, with which said engageable member is engaged for moving said spindle, is rotatable relative to the main frame.

2. A measuring instrument as set forth in claim 1, wherein, said engageable member is biased by rotary biasing means for biasing said spindle to rotate in a predetermined direction with respect to the first tubular member, so as to be constantly brought into pressing contact with the inner surface of one side of said elongate groove.

3. A measuring instrument as set forth in claim 2, wherein said rotary biasing means is a torsional coil spring engaged at one end portion with the interior of said elongate groove and at the other end portion with said spindle.

4. A measuring instrument wherein a spindle is axially movably and rotatably provided with respect to a main frame and dimensions and the like of a workpiece to be measured are measured from a displacement value of said spindle, comprising:
   means on said main frame for axially movably guiding said spindle;
   a first tubular member coupled onto said spindle, formed with an insertion groove in the axial direction thereof and axially movably supporting said spindle in a state where an engageable member projected from said spindle is inserted into said insertion groove;
   a second tubular member coupled onto said first tubular member and formed in the axial direction thereof with an elongate groove for engaging said engageable member, said elongate groove being blocked at opposite ends thereof;
   an outer tube rotatably coupled to said second tubular member and provided on the inner peripheral surface thereof with a spiral groove, with which is engaged the forward end of said engageable member;
   biasing means for biasing said engageable member in a predetermined direction of rotation with respect to said first tubular member so as to prevent a deflection of said spindle with respect to said first tubular member; and
   a displacement value detector provided on said spindle and including a first detecting member movable along with said spindle and a second detecting member affixed to the side of said first tubular member.

5. A measuring instrument as set forth in claim 4, wherein said first detecting member is affixed to a cutaway portion formed in the spindle in the axial direction thereof.

6. A measuring instrument as set forth in claim 4, wherein:
   said first tubular member is formed with a window portion, through which is said first detecting member affixed to the spindle is exposed to the outer periphery of the first tubular member;
   said second detecting member is secured to the first tubular member; and
   said first detecting member exposed through said window portion is opposed to said second detecting member.

7. A measuring instrument as set forth in claim 6, wherein the positional relationship between said first detecting member and said second detecting member is adjustable.

8. A measuring instrument as set forth in claim 6, wherein said biasing means is a coil spring, said coil spring is engaged at one end thereof with said elongate groove and at the other end thereof with said spindle, and a biasing force of said spring is adjustable.

9. A measuring instrument as set forth in claim 8, wherein an end position engageable with the spindle of said coil spring is engaged with a slit in a screw, which can be threadably coupled into the spindle.

10. A measuring instrument as set forth in claim 4, wherein an angle of torsion of said spiral groove is 10 to 15 degrees.

11. A measuring instrument as set forth in claim 4, wherein said outer tube is provided with constant pressure means, whereby said spindle makes idling with respect to the second tubular member when said spindle is brought into contact with a surface to be abutted and subjected to an abutting force of a predetermined value.

12. A measuring instrument as set forth in claim 11, wherein said constant pressure means comprises: an outer tube; a thimble coupled to said outer tube; and a spring affixed at one end thereof to said outer tube, having the other end thereof as being in free conditions and pressingly contacting the inner peripheral surface of said thimble by the outer peripheral surface thereof.

13. A measuring instrument as set forth in claim 4, wherein said main frame is provided with a digital indication portion for indicating a displacement value of the spindle detected by a displacement value detector and formed of an installation type.

* * * * *

UNITED STATES PATENT AND TRADEMARK OFFICE
CERTIFICATE OF CORRECTION

PATENT NO. : 4 561 185

DATED : December 31, 1985

INVENTOR(S) : Hideo SAKATA et al

It is certified that error appears in the above-identified patent and that said Letters Patent is hereby corrected as shown below:

Column 12, Line 56; change "6" to ---4---.

Line 60; change "6" to ---4---.

Signed and Sealed this

Twenty-fourth Day of June 1986

[SEAL]

Attest:

DONALD J. QUIGG

Attesting Officer

Commissioner of Patents and Trademarks